United States Patent
Kollep et al.

(10) Patent No.: US 9,572,450 B2
(45) Date of Patent: Feb. 21, 2017

(54) BEVERAGE PRODUCTION DEVICE FOR PRODUCING A BEVERAGE FROM A SINGLE-USE CAPSULE

(75) Inventors: Alexandre Kollep, Lutry (CH); Blaise Rithener, La Tour-de-Peilz (CH); Stefan Etter, Kehrsatz (CH); Rudolf Schenk, Konolfingen (CH)

(73) Assignee: Nestec S.A., Vevey (CH)

( * ) Notice: Subject to any disclaimer, the term of this patent is extended or adjusted under 35 U.S.C. 154(b) by 395 days.

(21) Appl. No.: 12/933,550

(22) PCT Filed: Mar. 16, 2009

(86) PCT No.: PCT/EP2009/053032
§ 371 (c)(1),
(2), (4) Date: Sep. 20, 2010

(87) PCT Pub. No.: WO2009/115474
PCT Pub. Date: Sep. 24, 2009

(65) Prior Publication Data
US 2011/0011271 A1    Jan. 20, 2011

(30) Foreign Application Priority Data
Mar. 20, 2008   (EP) .................................... 08153050

(51) Int. Cl.
*A47J 31/06*   (2006.01)
*A47J 31/36*   (2006.01)

(52) U.S. Cl.
CPC .......... *A47J 31/0668* (2013.01); *A47J 31/3633* (2013.01)

(58) Field of Classification Search
CPC .......... A47J 31/44; A47J 31/005; A47J 31/52; A47J 31/56; A47J 31/02; A47J 31/057; A47J 31/0668; A47J 31/0678; A47J 31/3633; A47J 31/0642; B65D 85/8043; B65D 25/067; B65B 25/067

(Continued)

(56) References Cited

U.S. PATENT DOCUMENTS

| | | |
|---|---|---|
| 4,136,202 A | 1/1979 | Favre |
| 4,846,052 A | 7/1989 | Favre et al. |

(Continued)

FOREIGN PATENT DOCUMENTS

| | | |
|---|---|---|
| CH | 605 293 | 9/1978 |
| EP | 0 512 470 | 11/1992 |

(Continued)

OTHER PUBLICATIONS

International Search Report for PCT/EP2009/053032 mailed Jun. 29, 2009, 4 pages.

*Primary Examiner* — Tu B Hoang
*Assistant Examiner* — Michael Hoang
(74) *Attorney, Agent, or Firm* — K&L Gates LLP

(57) ABSTRACT

Beverage production device for producing a beverage from a single-use capsule containing a beverage ingredient, comprising: a brewing unit that receives the capsule in a cavity defined by first and second engaging members that enclose the capsule and press it at a flange-like rim in a liquid seal-tight manner. At least one of the first and second engaging members comprises a substantially annular pressing portion for applying a sealing pressure on the flange-like rim of the capsule, the first and second engaging members being configured in relative closure at the nip to leak to a liquid injected in the cavity when a capsule is not present. One of at least the first or second engaging members comprises, at its annular pressing portion, at least one passage arranged for controlling liquid leakage only within (Continued)

a limited angular radial direction when the first and second engaging members are closed at the nip.

16 Claims, 8 Drawing Sheets

(58) Field of Classification Search
USPC .................. 99/295, 299, 304, 306, 278–283, 287,99/302 R; 426/413
See application file for complete search history.

(56) References Cited

U.S. PATENT DOCUMENTS

| | | |
|---|---|---|
| 5,347,916 A | 9/1994 | Fond et al. |
| 5,897,899 A | 4/1999 | Fond |
| 8,479,640 B2 | 7/2013 | Gavillet et al. |
| 2006/0110507 A1* | 5/2006 | Yoakim et al. ............... 426/433 |
| 2006/0230941 A1* | 10/2006 | Ryser et al. .................... 99/275 |

FOREIGN PATENT DOCUMENTS

| | | |
|---|---|---|
| EP | 0 602 203 | 6/1994 |
| EP | 1299022 | 4/2003 |
| EP | 1 646 305 | 4/2006 |
| EP | 1 654 966 | 5/2006 |
| EP | 1 757 212 | 2/2007 |
| EP | 1 859 713 | 11/2007 |
| FR | 2 617 389 | 1/1989 |
| WO | WO2007135136 | 11/2007 |
| WO | 2008037642 | 4/2008 |
| WO | 2009090201 | 7/2009 |

* cited by examiner

BEVERAGE PRODUCTION DEVICE FOR PRODUCING A BEVERAGE FROM A SINGLE-USE CAPSULE

The present invention relates to the production of beverages from a device adapted to receive a single-use capsule containing a beverage substance.

BACKGROUND OF THE INVENTION

The background of the present invention is the field of beverage production system using capsules which contain beverage or other comestible (e.g. soup) ingredients. By means of an interaction of these ingredients with a liquid, a beverage such as coffee or tea can be produced. The interaction can be for example a brewing (e.g., extraction) or dissolution process. Such a capsule is particularly adapted to contain ground coffee in order to produce a coffee beverage by having hot water under pressure enter the capsule and draining a coffee beverage from the capsule.

Systems and methods for obtaining beverages from substances containing capsules are known, for example, in EP-A-512470. Patent application EP 1 654 966 proposes an improvement for providing better sealing upon closure of the extraction system so as to better control the extraction characteristics, particularly the opening and extraction pressures. To do that, the capsule is equipped with an attached seal or a seal that forms an integral part of the cartridge so that each new brewed capsule seals perfectly into the extraction system, thereby avoiding any risks of water leaking and bypassing through the cartridge nip to the outside. An advantage of the invention is that it provides a renewed seal each time a capsule is used. Another advantage is that it allows the capsule to be released more easily by preventing the capsule from "sticking" in the capsule cage through the effect of suction or vacuum. To do that, the invention may provide air passages such as grooves on the pressing edge of the capsule cage.

However, one problem of the device is that when water is injected in the brewing unit, when no capsule is present, and since the brewing unit does not close in a liquid impervious manner, the unit will leak in an uncontrolled manner through the nip.

BRIEF SUMMARY OF THE INVENTION

The present invention aims at proposing a solution to this problem as well as other possible additional advantages.

For this the invention relates to a beverage production device for producing a beverage from a single-use capsule containing a beverage ingredient, comprising:

a brewing unit for receiving the capsule therein upon relative closing of a first and second engaging members forming a cavity for encasing the capsule and pressing it at a flange-like rim in a liquid seal-tight manner, wherein at least one of the first and second engaging members comprises a substantially annular pressing portion for applying a sealing pressure on the flange-like rim of the capsule, the first and second engaging members being configured in relative closure at the nip to leak to a liquid injected in the cavity when a capsule is not present, wherein at least one of the first or second engaging members comprises, at its annular pressing portion, flow directing means comprising at least one passage arranged for controlling a liquid leakage only within a limited angular radial direction at the nip when the first and second engaging members are closed.

Therefore, the device is now configured at the nip of the engaging members to control the direction of the leakage of water or liquid that comes out of the brewing unit when a capsule is not present in the unit and the unit is closed.

In particular, the first engaging member comprises a pressing portion having at least one annular pressing edge which is configured with at least one leak passage, preferably a series of passages, located within a limited angular path of the annular portion whereas outside of said angular path, the edge is free of any leak passage.

In a particular mode, the first engaging member comprises a pressing portion comprising at least one outermost annular pressing edge comprising at least one passage, preferably a series of passages, arranged only within a limited angular path of the edge. Liquid or water is thus forced to flow out of the brewing unit in a restricted angular flow path and no longer at a 360-degree direction of the brewing unit. As a result, the liquid can be more easily collected and drained, e.g., to a beverage outlet and/or collecting tray in the device.

Preferably, a series of leaking passages are present at an angular path of the edge within less than 90 degrees, most preferably, between about 1 and 50 degrees.

Preferably, the first outermost annular pressing edge comprises a series of indentations distributed circumferentially for delimiting passages therebetween and a substantially flat portion of edge outside said limited angular path.

In the preferred mode, the first engaging member comprises a second edge, i.e., an innermost pressing edge comprising a series of indentations forming liquid leak radial recesses between each adjacent indentation and an annular liquid collecting recess extending between the first and second pressing edges. When no capsule is present in the brewing unit, collection of water is improved by the collecting recess placed between the innermost and outermost annular pressing edges. This enables to ensure that the water flow is guided in the privileged direction at the exit of the brewing unit and can be so easily collected.

In particular, the indentations at the innermost pressing edge can be distributed substantially along the whole circumference of the edge. This has the advantage that it ensures a correct vacuum release after brewing a capsule in the brewing unit since air will enter in the cavity in all possible directions.

Therefore, on one hand the removal of the capsule can be facilitated. On the other hand, collection of water is still taken in charge by the intermediate annular recess and re-directed in the restricted angular path through the outermost pressing edge of the engaging member.

Preferably, the first engaging member has an internal recessed surface extending inwardly to delimit an internal cavity for receiving a body of the capsule. In other words, the first engaging member forms a "capsule cage" that covers the top and side wall of the body of the capsule and ends by the pressing portion to exert a pressing force on the flange-like rim of the capsule. The first engaging member can be formed of one single part or several parts which form a hydraulic piston assembly for providing an amplified closing pressure, as described in co-pending international patent application PCT/EP07/059930.

In a particular mode, internal ribs can be provided on the surface of the main cavity. Several internal ribs are preferably located evenly on the surface of the cavity to serve the purpose of centring the capsule in the cavity for ensuring that the sealing member of the capsule is precisely placed between the pressing portions of the enclosing members. For example, three ribs are placed in the cavity which are positioned at an angular distance of 120 degrees or four ribs positioned at an angular distance of 90 degrees.

In additional several grooves can be provided in the cavity which are recessed in the surface of the cavity. The grooves extends along at least 20% of the cavity length and in the longitudinal direction of the cavity. The grooves enable to reduce the vacuum effect between the capsule and the capsule cage and thus promote the retrieval of the used capsule after the brewing process when the device is reopened, i.e., when the engaging members are moved away relatively one another.

The capsule of the invention may be a gastight capsule which requires piercing by an injection means for enabling water to be injected in the capsule. For this, a water inlet and at least one piercing member can be provided in the bottom of the cavity for injecting water in the capsule. When the engaging members are closed about the capsule, the capsule is automatically pierced as a result of the closing by the piercing member(s). The piercing member(s) can be blade(s), needle(s) or any other suitable sharp piercing element(s). The water injection inlet of the cavity can be separate from the piercing member or be associated to it. For instance, the piercing members can be a series of blades placed about a central water injection inlet.

As known per se, an opening principle is based on pressure of the liquid that increases in the capsule during the brewing process which causes a delivery face of the capsule, e.g., a puncturable or tear membrane, to tear or pierce against the perforating element(s) of the second engaging member. Therefore, the second engaging member, onto which the capsule is also supported, can be provided with a transversal surface forming a series of perforating element suitable for perforating a delivery face of the capsule.

Also, typically, the second engaging member comprises a beverage outlet designed to guide beverage to a service tray onto which is placed a cup or glass when a beverage is produced by the device.

According to an aspect of the invention, the brewing unit is preferably oriented in closure of the engaging members with the flow director being oriented to direct the liquid flow downwards. Therefore, the liquid or water can be collected and, for example, be drained to a collecting reservoir in the device. In particular, the engaging members in closure mode can be oriented along an horizontal axis. This also provides the advantage to facilitate the insertion of the capsule between the engaging members and its removal after opening of the members by the effect of the gravity.

The invention also relates to a system for the production of a beverage from a single-use capsule containing a beverage ingredient comprising:

a single-use capsule comprising a beverage ingredient and comprising a sealing flange-like rim and, a brewing unit for receiving the capsule therein upon relative closing of a first and second engaging members forming a cavity for encasing the capsule and pressing it at the flange-like rim in a liquid seal-tight manner, wherein at least one of the first and second engaging members comprises an annular pressing portion for applying a sealing pressure on the sealing flange-like rim of the capsule, the first and second engaging members being configured in relative closure in the nip to leak to a liquid injected in the cavity when a capsule is not present, wherein one of at least the first or second engaging members comprise, at its pressing portion, flow directing means comprising at least one passage arranged for controlling the liquid leakage within a limited angular radial direction in absence of the capsule in the device when the first and second engaging members are closed at the nip.

The capsule can comprise at its flange-like rim a deformable sealing thickness of material. The sealing thickness can be a sealing member that is added on the flange-like rim or is integral with the rim. The sealing member can be, for instance, a rubber-elastic or plastic material. For instance, the sealing member is a small ring of silicone rubber which is connected to the flange like rim.

Considering the relationship between the brewing unit and the capsule when inserted in the device, the pressing portion of the first engaging member, e.g., capsule cage, can press firmly onto the sealing thickness of the capsule to provide a liquid tight arrangement during brewing. In particular, the thickness of the sealing material and its hardness can be determined to fill the gaps between the indentations of the innermost pressing edge when the device is closed about the capsule. For instance, the thickness of the sealing member is substantially maximal in the area of the innermost pressing edge. The maximal thickness can be of from about 0.1 to 2.0 mm, most preferably of from 0.2 to 1.0 mm. Its hardness can also be advantageously below 61 shore A.

The capsule of the invention can be a gastight seal capsule containing a dose of substance such as ground coffee powder. The capsule may be of a simple structure comprising a body and a tear membrane that is welded onto the rim of the body. The tear membrane is usually made of aluminium and/or plastic of several micrometers. For aluminium, the thickness of the tear membrane is preferably comprised between about 10 and 100 microns. In order to maintain freshness in the capsule, the capsule is substantially removed from oxygen and a protective gas can be contained in the capsule such as nitrogen or any other suitable inert gas.

BRIEF DESCRIPTION OF THE FIGURES

FIG. 3 is a partial view in cross section of the beverage production device of FIG. 1 and in closed mode with no capsule inserted in.

DETAILED DESCRIPTION OF THE INVENTION

Figure 1:
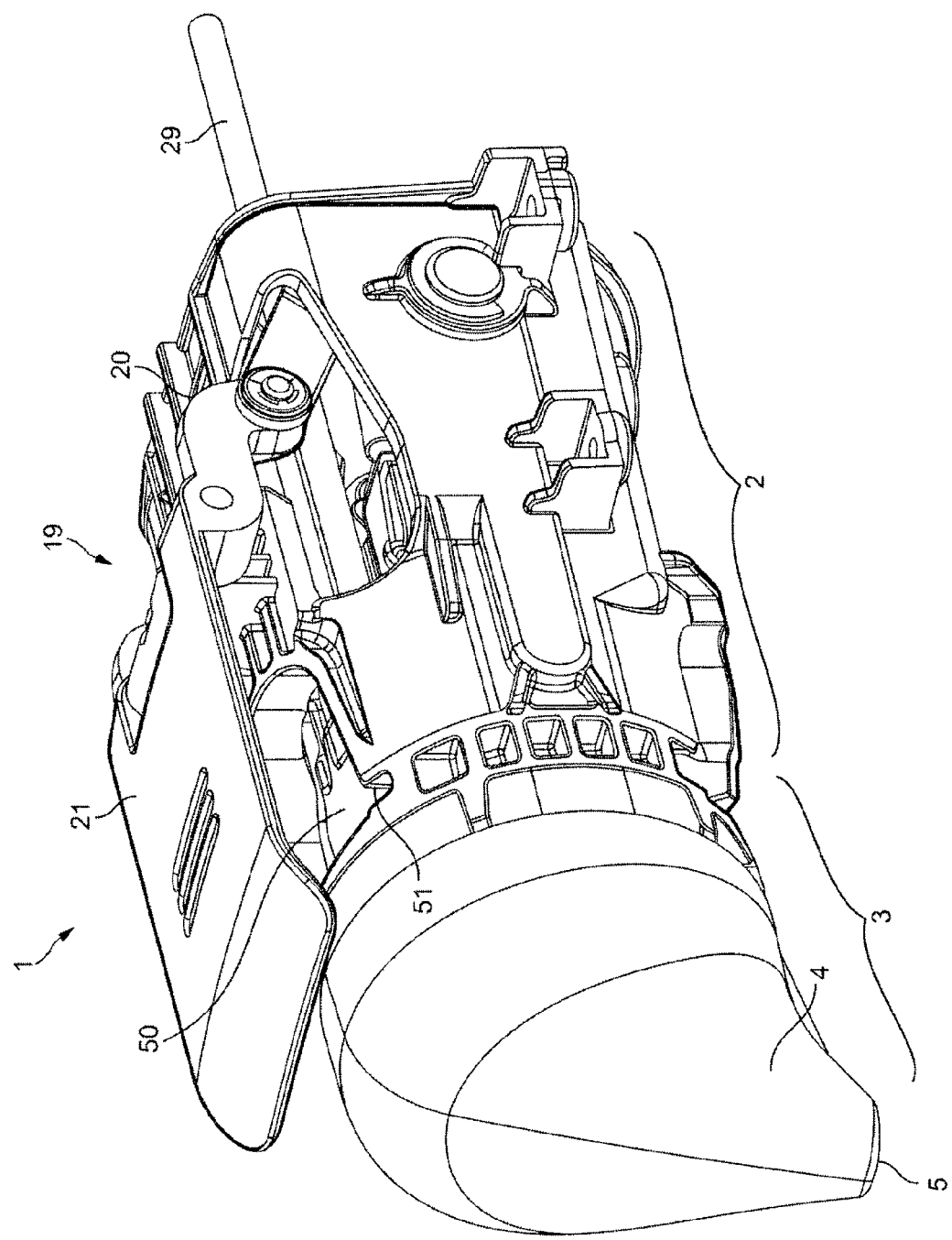
FIG. 1 is a perspective partial view of a beverage production device according to a mode of the present invention in a closed state.
Figure 2:
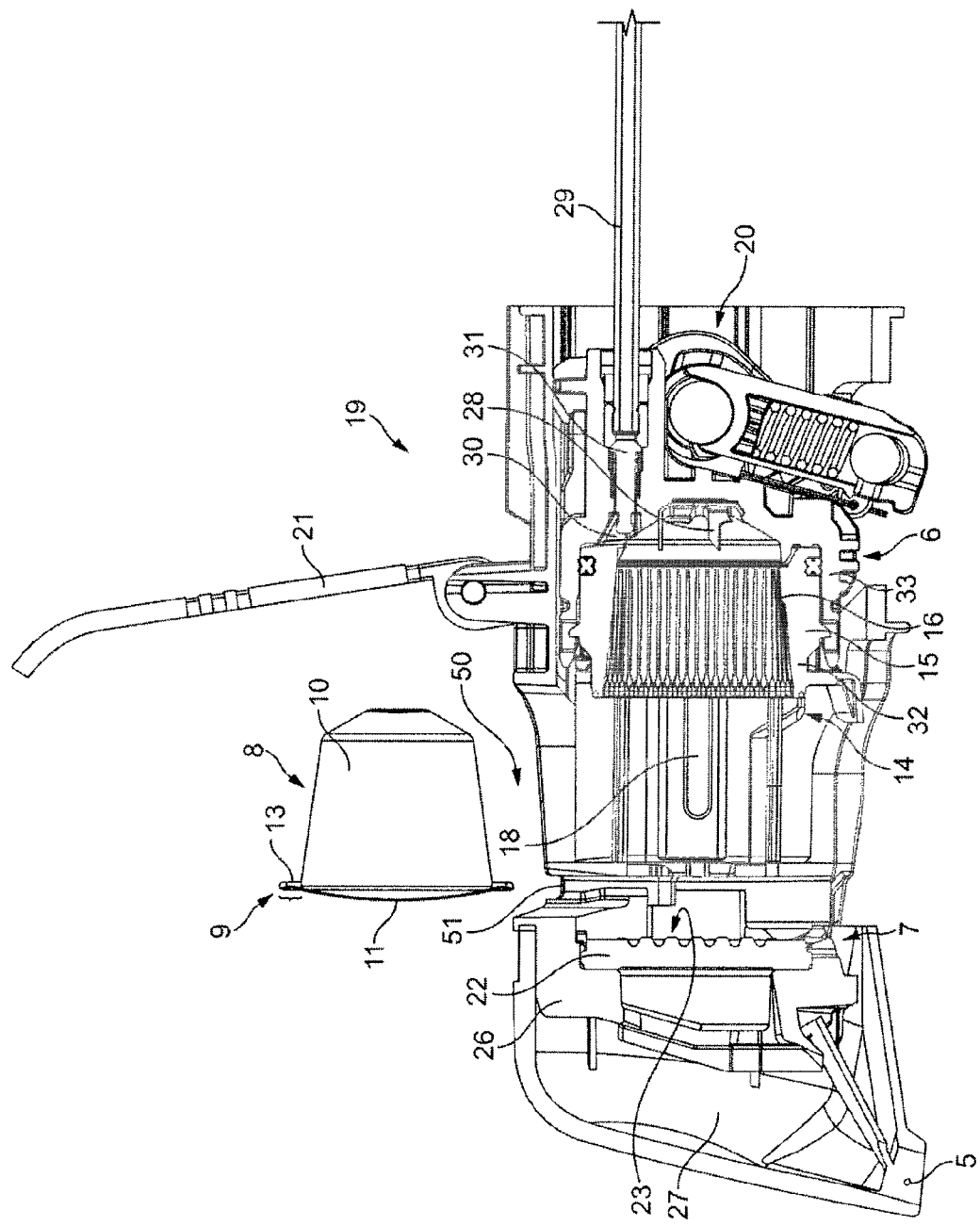
FIG. 2 is a partial view in cross section of the beverage production device of FIG. 1 and in open mode before a capsule is inserted in the device.

A partial view of a beverage production device is illustrated in FIGS. 1 and 2. For reasons of simplicity, only the brewing unit 1 of the complete device is shown. However, such unit is integrated in or combined to a more complex device, e.g., a coffee machine, which comprises additional components, in particular, a water supply, a water transport means such as a pump, a heater, an electronic control board, a drip tray, a capsule tray, etc.

In the present description, the term "beverage production system" is used to define the combination of a beverage production device and a capsule adapted to be brewed in the device.

In a general manner, the brewing unit 1 comprises a frame 2 and a beverage outlet assembly 3 forming a flow director for the beverage. The flow outlet assembly comprises a cover 4 which terminates by an outlet 5 directed downwards.

The brewing unit is arranged to receive a single-use capsule 8 containing a beverage ingredient to be brewed. The term "capsule" encompasses any flexible, semi-rigid and/or rigid containers. Preferably, the capsule is a gastight container made of aluminium and/or plastic which is opened, for receiving water in, by suitable opening means of the unit.

Therefore, the brewing unit 1 comprises a first and second engaging members 6, 7 which close relatively one another about a capsule 8 to form a brewing enclosure around the capsule. The engaging members can be made of several elements which are fixed or mobile relatively one another. As shown in FIG. 2, the capsule 8 can be inserted by gravity in a top opening 50 and along guiding side channels 51 of the brewing unit and then be maintained in an intermediate position before closure of the engaging members 6, 7 by a suitable guiding/retaining system as described in EP1646305B1 or EP1757212B1.

The capsule 8 of the preferred beverage production system usually comprises a flange-like rim 9 for sliding along the guiding channels 51 of the brewing unit and onto which is intended to be applied the closure pressure of the engaging members in their closed position about the capsule. The capsule comprises a truncated body 10 and a tear membrane 11 sealed onto the rim 9. A sealing member 13 can further be part of the capsule to ensure water tightness at the flange-like rim when the sealing member is compressed at the nip by the engaging members.

The sealing member 13 can be an additional member made of rubber-elastic, or soft plastic, a foam, paper or fibres or any other suitable compressible sealing means able to provide an effective sealing effect. It may also be a built-in part of the flange-like rim itself, for example of relatively soft plastic, when the body of the capsule itself is made of plastic.

Figure 3:
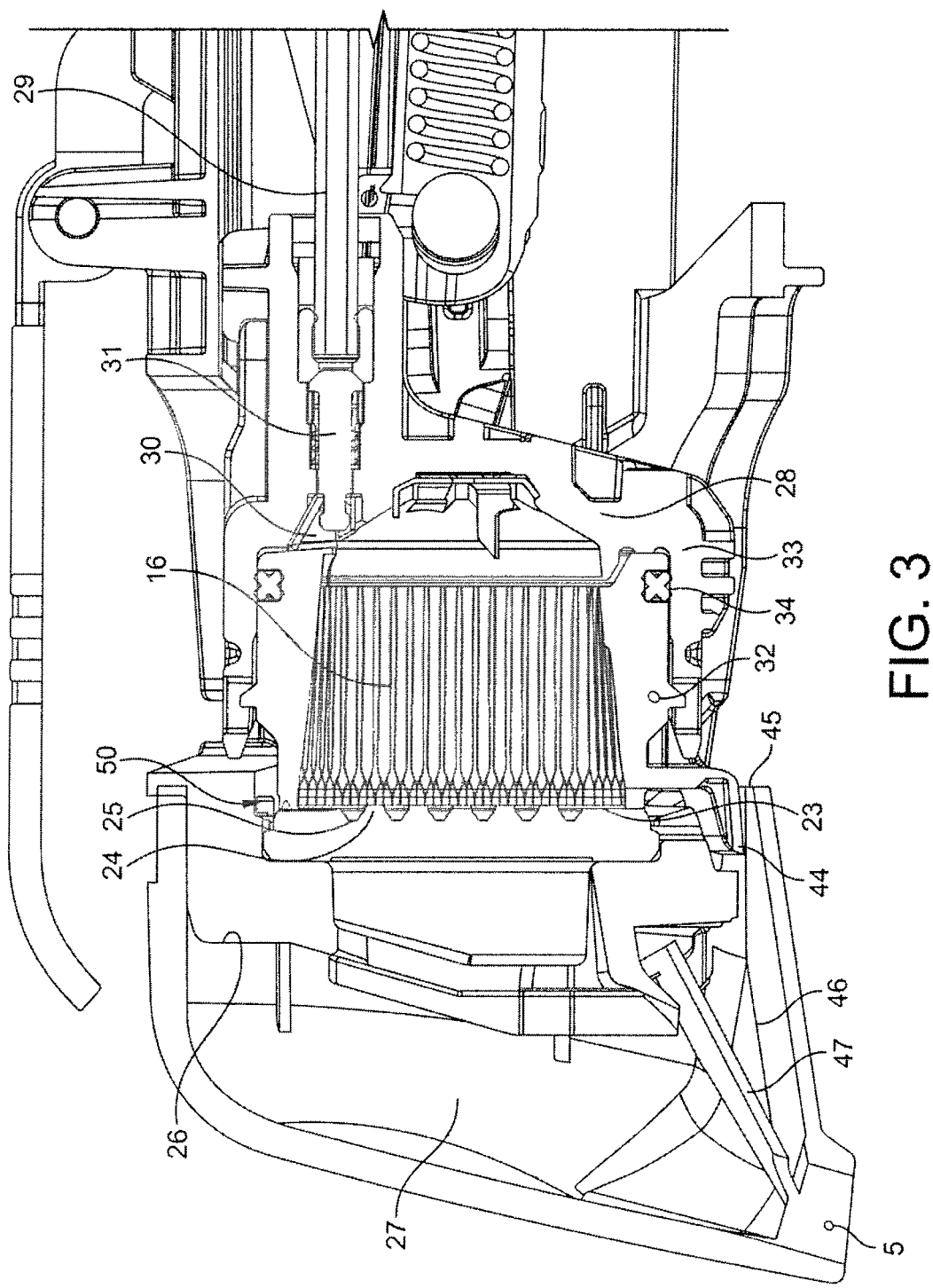

In a preferred mode illustrated in FIGS. 2 and 3, a first engaging member 6 comprises a specially designed annular pressing portion 14 which is intended to apply a closing pressure onto the flange-like rim 9 of the capsule. The portion 14 can be part of a capsule cage 15 comprising a large cavity 16 configured for receiving the body of the capsule upon closing. The first engaging member 6 is configured in the frame to be guided in movement, e.g., a translational movement, from an open position to a closed position and vice versa, i.e., against the capsule and/or second engaging member 7. For this, the capsule cage comprises diametrically opposed lateral protrusions 17 (FIG. 4) that engage in longitudinal guiding rails or slots 18 provided on the sides of the frame. The movement of the engaging member 6 in open and closure positions is commanded by an actuating assembly 19 which can be manual or motor-driven. In the illustrated mode, the actuating assembly comprises force demultiplication means 20 including a knee-joint mechanism and a manual lever 21. A precise description of a beverage production module comprising these actuating means is given in EP1859713A1. Other possible mechanisms such as a cam type system or an hydraulic closure system, can as well be utilized for actuating the engaging member(s) one relative to the other in closure. For instance, a closure system is also described in co-pending European patent application EP 07117853.7 in another preferred mode.

The second engaging member 7 can be fixed with respect to the frame. In a preferred mode, the second engaging member comprises a capsule holder 22 comprising a transversal surface onto which the capsule is pressed. More particularly, the surface comprises a substantially flat or slightly concave annular pressing surface 23 onto which the flange-like rim of the capsule can be pressed. The capsule holder can be fixedly inserted in a front framework 26 of the unit. In the centre of the capsule holder is placed a series of perforating elements 24 suitable for perforating the tear membrane 11 of the capsule. The perforating elements serve for opening the tear membrane of the capsule when a sufficient pressure of liquid has been reached in the capsule. The perforating elements can form a network of small protrusions such as pyramids or cones which are spaced apart to delimit channels 25 inbetween. The channels 25 enables the beverage liquid to be collected and be drained through the capsule holder via through-holes (not illustrated) and into the outlet assembly 3. For example, the outlet assembly 3 is fixed to the front framework 26 by any suitable connection means. A main cavity 27 narrows down towards the beverage outlet assembly to collect and guide the beverage to the outlet 5. Examples of particular structures of the capsule holder are described in EP512470B1. Of course, other possible perforating structures of the tear membrane can be envisaged such as needles, circular or radial ribs or blades. Also, a single perforating element, for example a central point, can be used.

The first engaging member can further comprise piercing elements 28 for piercing openings in a first water introduction side of the capsule. The piercing elements are preferably positioned in the cavity 16 of the capsule cage. Preferably, several piercing elements, e.g., 2 to 8 blades or needles, are provided in the cavity. As a matter of example, EP1299022B1 provides a capsule cage comprising a preferred arrangement of the piercing elements in the cage. The cavity is also in water communication with a water supply line 29 arranged through the first engaging member. The supply line 29 ends in the cavity by a water inlet 30 which may be selectively closed by a spring biased valve 31 for preventing residual water in the water line from dripping in the cavity when the water pump is stopped while maintaining water in the water line for facilitating self priming of the pump. The water line may be placed in an off-centred configuration in the cavity (as illustrated) or, alternatively, in the alignment of the longitudinal axis of the cavity inside the pattern defined by the piercing elements 28 as described in EP1299022B1.

Furthermore, the first engaging member 6 can be formed of a capsule cage with several parts including a piston part 32 forming an hydraulically amplified closure system, as described in co-pending international patent application PCT/EP07/059930. For this, the capsule cage comprises a piston part 32 and a rear support 33 which are mounted together, with an intermediate seal 34, to push the pressing portion 14 of the piston part onto the capsule and/or capsule holder under the effect of the pressurized water being injected in the cage.

In the inner surface of the cavity 16 of the capsule cage comprises several internal grooves 12 extending substantially longitudinally in the cavity to prevent the capsule from sticking by the vacuum forces to the capsule cage. Preferably, the grooves extend over the whole length of the part 32.

According to a principle of the invention, a flow director means is provided at the annular pressing portion 14 for controlling the liquid leakage, in particular, in closed conditions of the engaging members when a suitable capsule 8 is not inserted in the device.

FIG. 3 shows a mode in which the engaging members 6, 7 are closed while no capsule being present. The engaging members 6, 7 thus press against each other at the nip 50.

Figure 4:
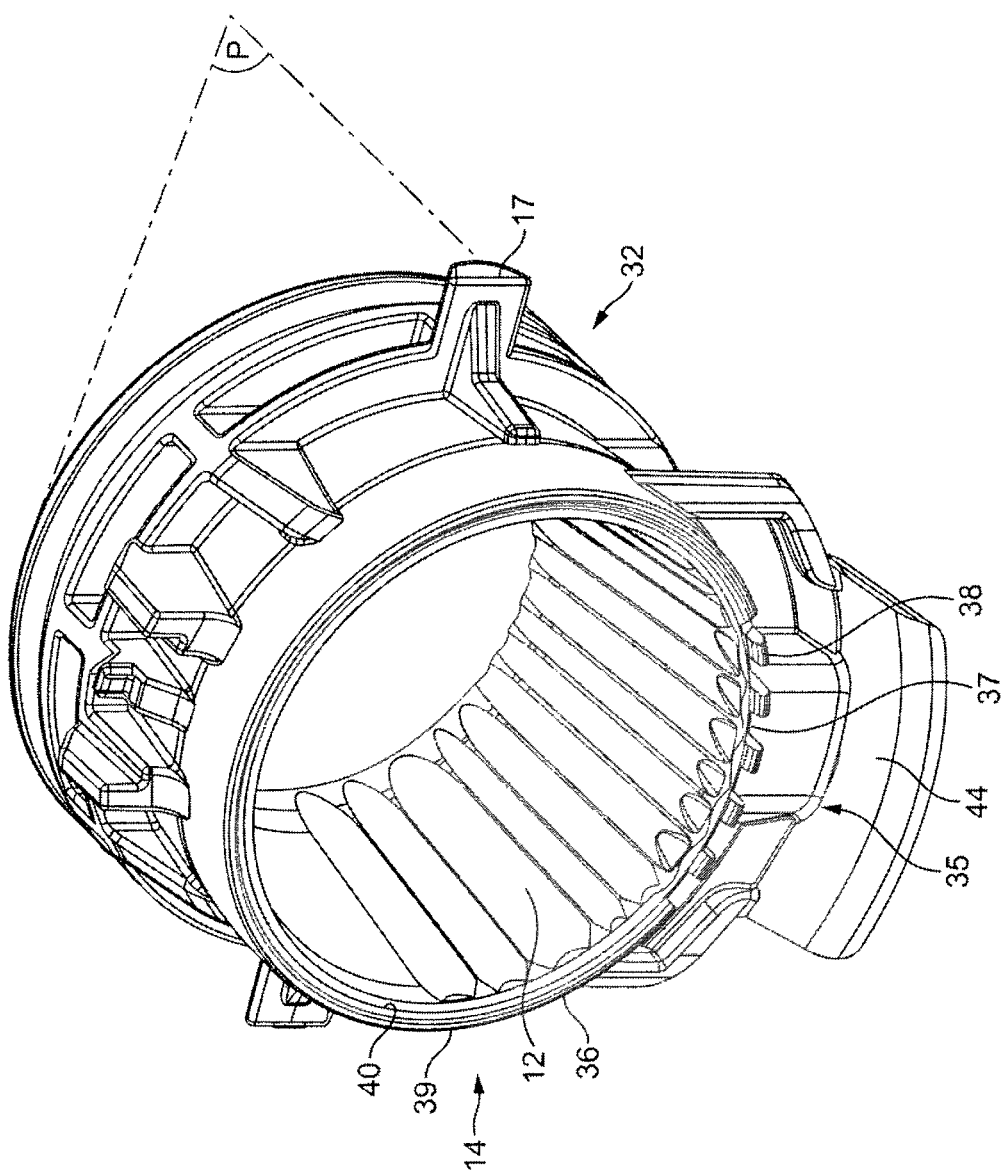
FIG. 4 is a perspective view of a capsule cage according to a first possible mode of the invention.

FIG. 4 illustrates a possible configuration of the piston part 32 of the first engaging member with a particular configuration of the pressing portion 14. In this example, the pressing portion 14 comprises a first outer annular pressing edge 36 comprising a series of liquid flow passages 37 provided along a limited angular path 35 of the annular edge 36. Preferably, the passages are provided within an angular path of less than 130 degrees, most preferably less than 90 degrees. Preferably, the passages are oriented below the median horizontal plane P of the cage when such cage is installed in a substantially horizontal position in the brewing unit. For instance, from 1 to 20 individual passages can be provided. The passages are preferably limited by several indentations 38 which are distributed within the angular path of the pressing edge. The pressing edge comprises a substantially flat edge 39 outside of the angular path comprising the passages. The flat edge is intended to press directly on the annular pressing surface 23 to form a tight seal nip arrangement when the two engaging members are closed with no capsule being encased therein (FIG. 3). Therefore, since the flat edge extends over a part only of the annular periphery of the edge, the passages 37 at the edge provides a controlled leakage of liquid when the engaging members are closed when there is no suitable capsule in the device. More particularly, the passages direct the flow in a restricted angular flow path or passage area 35. Preferably, the flow of liquid that leaves the cavity is thus guided in a downward direction at the nip 50.

Figure 5:
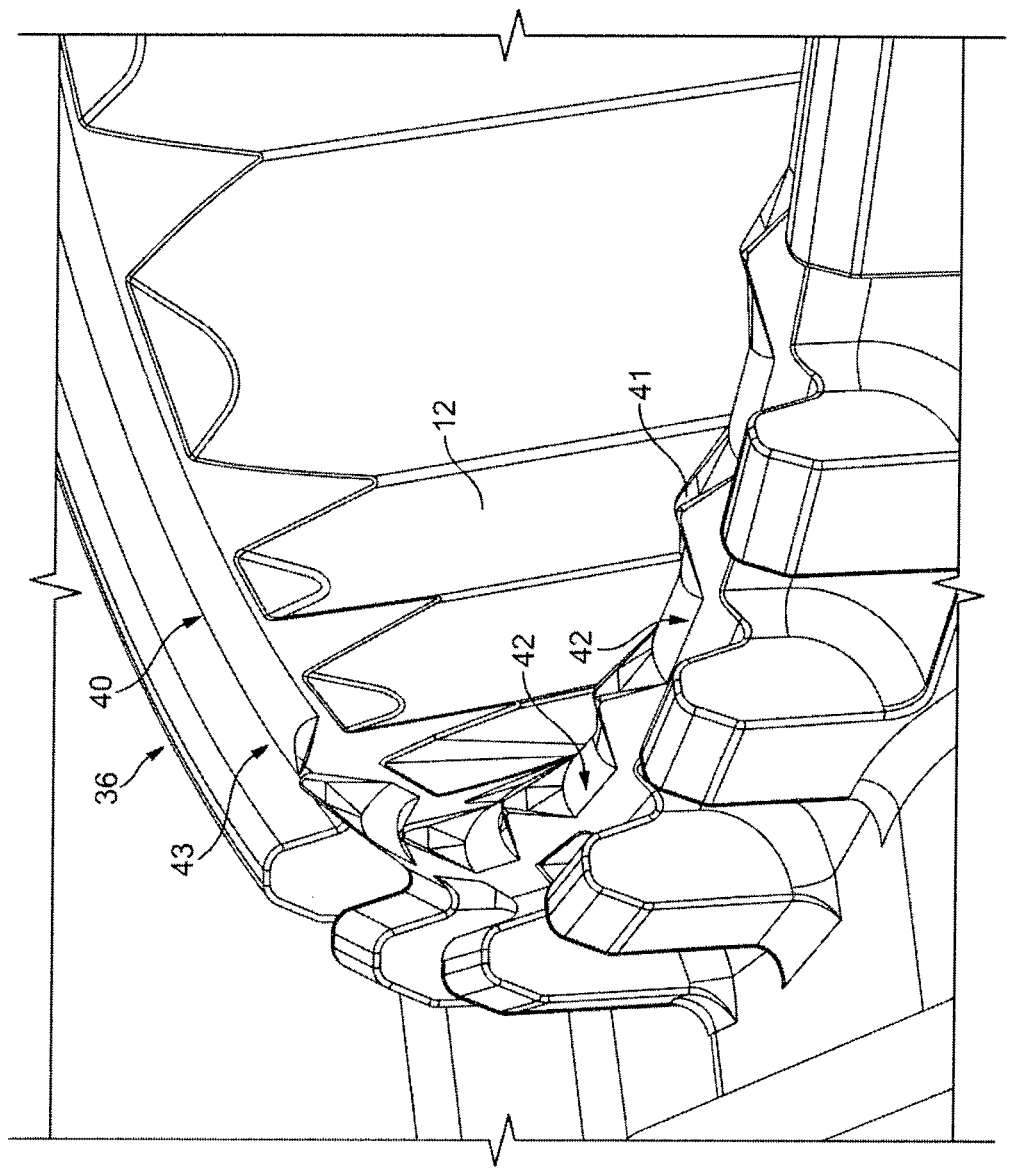
FIG. 5 is a detail view of the capsule cage of FIG. 4.

The pressing portion 14 further comprises an inner annular pressing edge 40 which is visible in more detail in FIG. 5. The inner edge 40 also comprises a series of indentations 41 delimiting flow passages 42 therebetween. Preferably, a central annular recess 43 is formed between the outer edge 36 and the inner edge 40. The central recess 43 permits the collection of liquid that traverses through the inner edge before it traverses through the outer edge. In this example, the indentations on the inner edge are provided only along a limited angular path of the edge. For instance, the indentations are provided substantially in the same angular area but not necessarily should they distribute along the same angular path. As it is shown in FIG. 4, a flow deflecting part 44 can be provided, in an off-centred position, at the periphery of the pressing portion 14. More particularly, the flow deflecting part 44 is placed below the flow passages 37 of the outer pressing edge to receive the liquid flow and guide it in the outlet assembly 3 in the closed position of the engaging members. In FIG. 3, for example, one can see that the flow deflecting part 44 engages in a rear opening 45 of the cover of the outlet assembly. The part 44 is used to guide the liquid flow in a cavity 46 of the outlet assembly and then directly to the beverage outlet 5. The cavity 46 can be demarcated from the main cavity 27 by a separating wall 47 or alternatively can be the same cavity as cavity 27. It can also be noted that the liquid could be drained to a different location such as in a drain reservoir placed directly below the nip. In this case, a flow deflecting part would not be necessary. The flow deflecting part 44 can take different forms such as an inclined surface with or without a portion of funnel and/or a tube.

Figure 6:
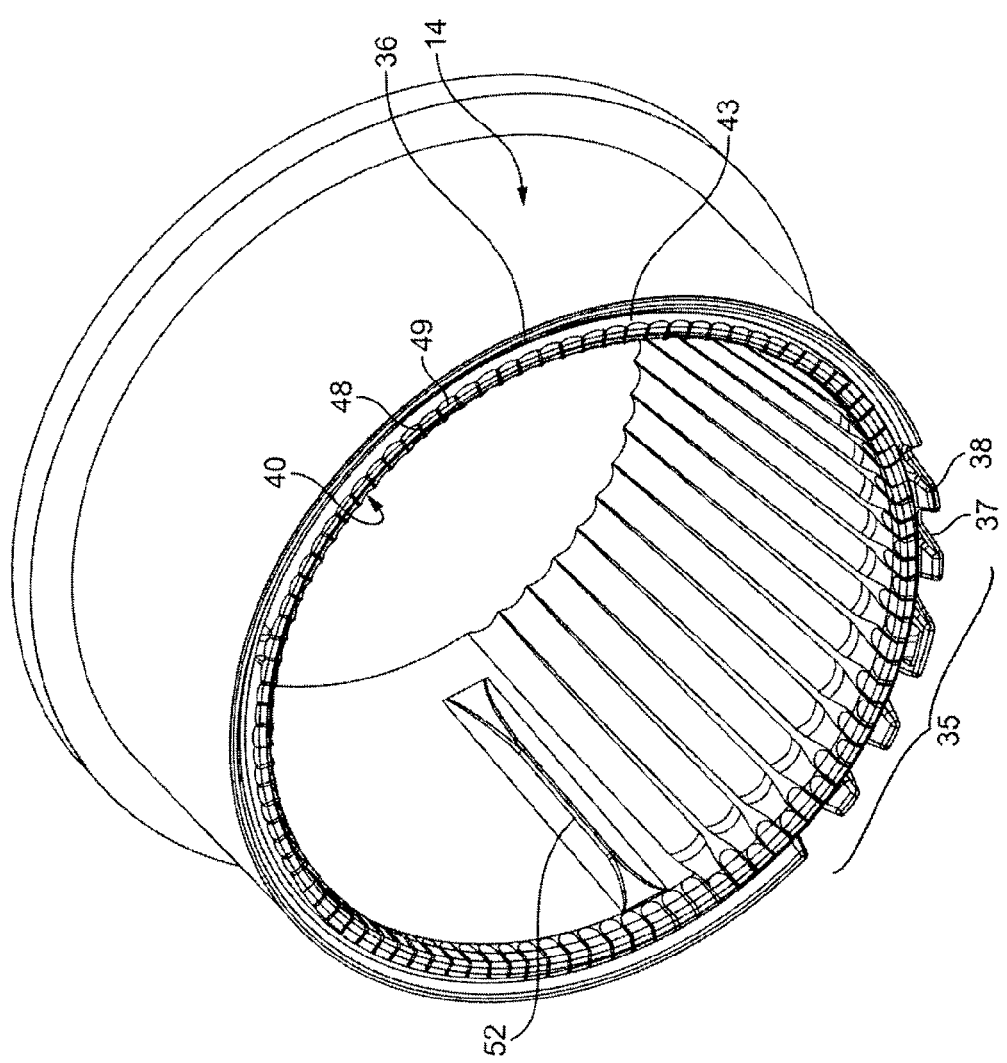
FIG. 6 is a perspective view of the capsule cage according to a possible second mode of the invention.
Figure 7:
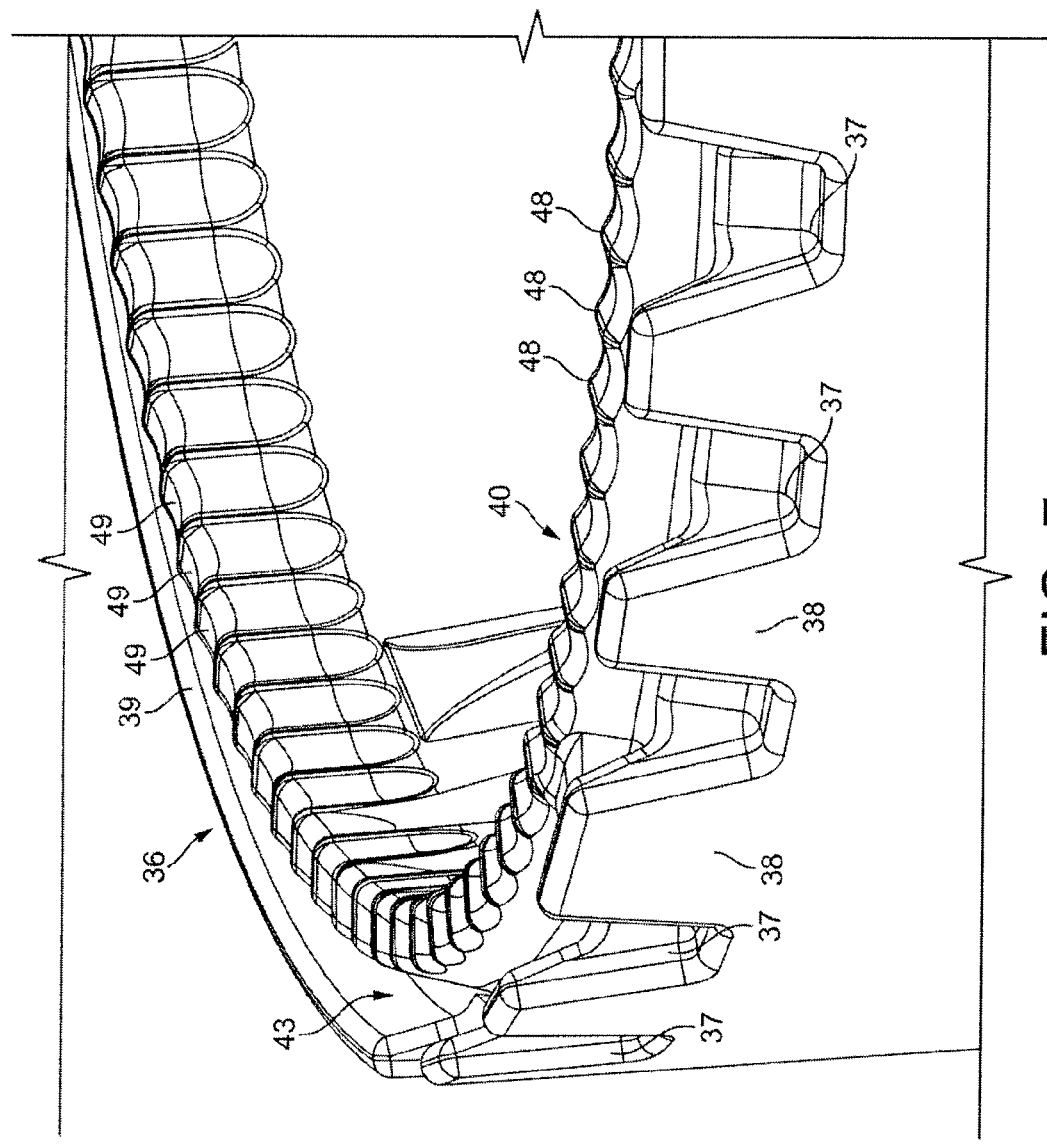
FIG. 7 is a detail view of the capsule cage of FIG. 6.

FIGS. 6 and 7 show a different embodiment of the flow directing means of the pressing portion. The pressing portion 14 here comprises an outer edge 36 and inner edge 40 separated by an annular recess 43. The outer edge has a series of indentations 38 forming in-between liquid leaking passages 37 localized in a limited angular path or passage area 35 of the edge. Outside of the passages' area, the edge then is flat, i.e., non-corrugated in the peripheral direction, for providing a continuous pressing edge surface or edge line 39. The inner edge 40 has then indentations 48 distributed substantially along its whole peripheral length. According to this principle, a leakage area is promoted through the whole periphery of the inner edge by small recesses 49 formed between the indentations 48. The liquid is then collected in the annular recess 43 which guides the liquid flow to the localized passage area 35 of the outer edge. The indentations 48 can be shaped such as each one ends by an apex and each passage 49 forms a concave curve to promote a better sealing on the flange-like rim of the capsule.

It should be noted that the pressing portion can be formed of an outer and inner edges made which are integral of a same element. However, alternatively, the outer edge can be formed of a different element. For example, the outer edge can be formed or a more elastic material such as thermoplastic elastomer (TPE) than the inner edge which can be formed of hard plastic or metal.

In the inner surface of the cavity 16 of the capsule cage can be further provided internal grooves 12 extending substantially longitudinally to prevent the capsule from sticking by the vacuum forces to the capsule cage.

Additionally, several ribs 52 can be placed at regular interval in the capsule cage for providing a centring means for the capsule in the capsule cage. The centring of the capsule in the capsule cage ensures that the flange-like rim of the capsule is placed precisely at the nip between the pressing portions of the engaging members.

As illustrated in FIG. 3, when no capsule is inserted in the device (or in certain possible circumstances, when an undesired capsule is inserted which is not suitable to provide a liquid tight sealing engagement), a controlled liquid leakage is performed. This leakage is obtained by the flow directing means, as described, in particular, the judicially placed passages in the pressing portion of the engaging member(s). In particular, the flow directing means are configured so that water injected in the cavity will flow through the passages downwardly to the drain, e.g., to the flow deflector then to the cavity of the beverage outlet. This arrangement enables to collect all water when no capsule is present in the device (e.g., during a rinsing of the capsule cage).

Figure 8:
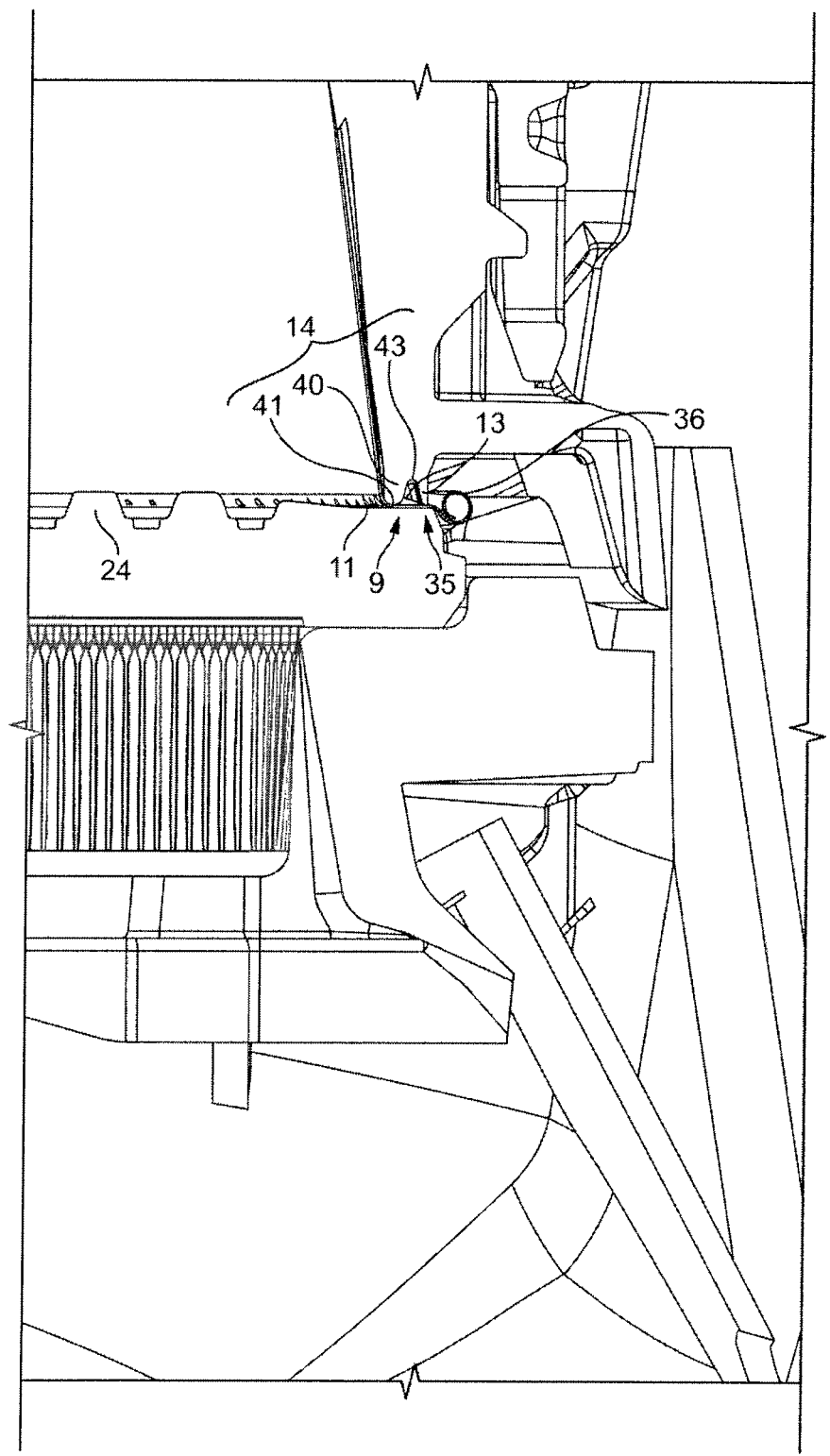
FIG. 8 shows a detail of the leak tight sealing arrangement of the capsule in the brewing unit at the nip.

FIG. 8 shows a capsule encased in the brewing unit with its sealing member 13 being pressed at the nip 35. The capsule comprises a sealing member which is compressed by the innermost pressing edge 40 to provide a leak tight sealing arrangement. In particular, the material of the sealing member, e.g., silicone rubber, is compressed by the indentations 41 whereas the material fills the passages or recesses placed between the indentations. As a result, an effective liquid barrier is obtained at the innermost pressing edge 40 and a liquid by-pass at the nip is prevented enabling a high pressure to be created in the capsule when water is injected in the capsule and, consequently, the tear membrane 11 to be torn against the puncturing elements 24 as a result of the rise of pressure in the capsule. The outermost pressing edge 36 may also press on the flange like rim 9 of the capsule at or in the vicinity of the sealing member. The outermost pressing edge 36 and the annular recess 43 can reinforce the effectiveness of the liquid tightness of the pressing portion 14 by creating a second physical hurdle to the liquid.

The effectiveness of the seal also depends on the dimensions, the geometry and grade (hardness) of the material of the sealing member and, therefore, should be adapted to compensate for the gaps left by the passages at the pressing portion, in particular, the passages 42, 49 at the innermost pressing edge 40. In particular, the thickness of the sealing member in the region of the innermost pressing edge is higher than the height of the passages 42. The hardness of the sealing material is preferably not more than 60 shore A, most preferably of about 30+/−5 shore A to remain sufficiently compressible. As a matter of example only, the maximum thickness of the sealing member can be of between 0.4 and 1 mm. The passages 42 may be comprised between 0.2 to 0.7 mm. Of course, these numerical parameters are non limiting to the invention but only given for illustration purpose of a working example.

The sealing member could also be integral to the body 10 and its material could be the same as the body's material of the capsule such as in relatively soft plastic. In such case, the sealing member can be formed, for example, by an increased thickness of the flange like rim in the area of the pressure portion 14.

The invention may include many possible variants. For example, the brewing unit may comprise two engaging members which are both mobile in closure. In another possible embodiment, the pressure portion may be formed of only a single pressing edge which has leaking passage(s) in a limited angular path. In another possible embodiment, the system is designed to accommodate capsules of symmetrical shape such as capsules described in EP0602203B1. This means that the engaging members comprise receiving cavities of substantially the same shape to receive the capsule and press onto a flexible flange-like rim.

The invention claimed is:

1. A beverage production device for producing a beverage from a single-use capsule containing a beverage ingredient, the beverage production device comprising:
   a brewing unit configured to receive the single-use capsule in a cavity defined by a first engaging member and a second engaging member that enclose and press the single-use capsule at a flange-like rim in a liquid seal-tight manner, the first engaging member having an internal recessed surface that extends inwardly to define an internal cavity for receiving at least a part of the single-use capsule, the first engaging member comprising an annular pressing portion for applying a sealing pressure on the flange-like rim, a water inlet and at least one piercing member provided at a bottom of the internal cavity of the first engaging member for injecting water in the single-use capsule, the first engaging member and second engaging member configured to be in closure at a nip to leak a liquid injected in the internal cavity when the single-use capsule is not present, and the annular pressing portion comprising
   an outermost annular pressing edge comprising one or more leak passages, all of the one or more leak passages together in combination are
   arranged only within an angular path within less than 90 degrees on the outermost annular pressing edge, the outermost annular pressing edge not including any leak passage between 90 and 360 degrees, and the outermost annular pressing edge comprising a flat portion outside the angular path, the brewing unit oriented to close the first engaging member and the second engaging member with the one or more leak passages oriented along a horizontal axis to direct a water flow downward,
   an innermost pressing edge comprising a series of indentations forming liquid leak passages between each of the indentations, and
   an annular liquid collecting recess extending between the innermost pressing edge and the outermost annular pressing edge.

2. The beverage production device according to claim 1, wherein the outermost annular pressing edge comprises an additional series of indentations circumferentially distributed for delimiting passages therebetween.

3. The beverage production device according to claim 1, wherein the series of indentations of the innermost pressing edge are distributed along a whole circumference of the innermost pressing edge.

4. The beverage production device according to claim 1, wherein internal grooves are provided on a surface of the internal cavity of the first engaging member.

5. The beverage production device according to claim 4, wherein the second engaging member has a transversal surface forming a series of perforating elements suitable for perforating a delivery face of the single-use capsule.

6. The beverage production device according to claim 1, wherein the internal cavity is horizontal in the brewing unit and has a median horizontal plane, and all of the one or more leak passages are oriented below the median horizontal plane of the cavity.

7. The beverage production device according to claim 1, wherein all of the one or more leak passages extend longitudinally in an inner surface of the internal cavity.

8. The beverage production device according to claim 1, wherein the series of indentations of the innermost pressing edge are radially out of alignment with reference to indentations at the outermost annular pressing edge.

9. The beverage production device according to claim 1, wherein the series of indentations of the innermost pressing edge are distributed along an inner angular path greater than the angular path of the one or more leak passages together in combination.

10. The beverage production device according to claim 1, wherein the one or more leak passages is a plurality of leak passages that forms a series of leak passages, and the one or more leak passages extend from one end of the internal cavity in a direction toward an opposite end of the internal cavity.

11. The beverage production device according to claim 1, comprising a flow deflecting part positioned below the one or more leak passages and configured to direct the water flow from the one or more leak passages into an outlet assembly of the beverage production device when the first engaging member and the second engaging member enclose the single-use capsule.

12. The beverage production device according to claim 11, wherein the flow deflecting part is engaged with a rear opening of a cover of the outlet assembly and positioned to guide the water flow to a beverage outlet of the outlet assembly.

13. A system for the production of a beverage from a single-use capsule containing a beverage ingredient, the system comprising:
   the single-use capsule comprising the beverage ingredient and comprising a sealing flange-like rim; and
   a brewing unit configured to receive the single-use capsule therein upon closing of a first engaging member and a second engaging member that form a cavity for enclosing and pressing the single-use capsule at the sealing flange-like rim in a liquid seal-tight manner, the first engaging member having an internal recessed surface that extends inwardly to define an internal cavity for receiving at least a part of the single-use capsule, the first engaging member comprising an annular pressing portion for applying a sealing pressure on the sealing flange-like rim of the single-use capsule, a water inlet and at least one piercing member provided at a bottom of the internal cavity of the first engaging member for injecting water in the single-use capsule, the first engaging member and the second engaging member designed to be in closure at a nip to leak a liquid injected in the internal cavity when the single-use capsule is not present, and the annular pressing portion comprising an outermost annular pressing edge comprising one or more leak passages, all of the one or more leak passages together in combination are arranged only within an angular path within less than 90 degrees on the annular pressing edge, the annular pressing edge not including any leak passage between 90 and 360 degrees, and the annular pressing edge comprising a flat portion outside the angular path, and the brewing unit oriented to close the first engaging member and the second engaging member with the one or more leak passages oriented along a horizontal axis to direct a water flow downward, an innermost pressing edge comprising a series of indentations forming liquid leak passages between each of the indentations, and an annular liquid collecting recess extending between the innermost pressing edge and the outermost annular pressing edge.

14. The system according to claim 13, wherein the single-use capsule comprises a deformable sealing material at the sealing flange-like rim.

15. The system according to claim 14, wherein the added sealing member is a rubber-elastic or plastic material.

16. The system according to claim 13, wherein the single-use capsule comprises an added sealing member at the sealing flange-like rim.

* * * * *